(12) United States Patent
Ching

(10) Patent No.: US 6,901,338 B2
(45) Date of Patent: May 31, 2005

(54) METHOD OF POWER CONTROL SYSTEM FOR A PDA WITH A MICROPROCESSOR

(75) Inventor: Wei-Lie Ching, Taipei Hsien (TW)

(73) Assignee: Inventec Appliances Corp., Taipei (TW)

(*) Notice: Subject to any disclaimer, the term of this patent is extended or adjusted under 35 U.S.C. 154(b) by 0 days.

(21) Appl. No.: 10/248,485

(22) Filed: Jan. 23, 2003

(65) Prior Publication Data

US 2004/0148115 A1 Jul. 29, 2004

(51) Int. Cl.$^7$ .................................................. G06F 1/32
(52) U.S. Cl. ............................ 702/63; 702/60; 702/64; 713/300
(58) Field of Search ........................ 702/63, 60, 64; 713/300, 310, 320–324; 710/18, 14, 260–262, 264–267; 320/114, 110, 112

(56) References Cited

U.S. PATENT DOCUMENTS 5,581,772 A * 12/1996 Nanno et al. ............... 713/340
5,708,816 A * 1/1998 Culbert ....................... 710/264
5,790,875 A * 8/1998 Andersin et al. ........... 713/320

* cited by examiner

Primary Examiner—Hal D Wachsman
(74) Attorney, Agent, or Firm—Winston Hsu

(57) ABSTRACT

A method for managing a power control system of a PDA (personal digital assistant) with a microprocessor. The PDA includes a CPU (central processing unit) for processing data and a microprocessor for controlling power control system functions including: switching the PDA from OFF mode to SHUTDOWN mode, such that when the PDA is in OFF mode, the CPU and the microprocessor are both off, and when the PDA is in SHUTDOWN mode, the CPU is off while the microprocessor is on; switching the PDA from SHUTDOWN mode to ON mode, such that when the PDA is in ON mode, the CPU and the microprocessor are both on; and, switching the PDA between SHUTDOWN mode and STANDBY mode, such that when the PDA is in STANDBY mode, the CPU idles and the microprocessor sleeps.

19 Claims, 3 Drawing Sheets

METHOD OF POWER CONTROL SYSTEM FOR A PDA WITH A MICROPROCESSOR

BACKGROUND OF INVENTION

1. Field of the Invention

The invention relates to a method of power control for a PDA, and more particularly, to a method of power control for a PDA with a microprocessor.

2. Description of the Prior Art

Nowadays, low-polluting electric power applications are advocated and many electric appliances use electric power to operate. A reduction in the volume and the weight of electric appliances makes the appliances more convenient and portable. A PDA (Personal Digital Assistant) is a portable and popular device and can allow users to manage their schedules and to store data. Compared with a desktop or a notebook, it is more convenient for users who have to deal with computer data mobilely like sales and on-line production managers. Like other portable electric appliances, a battery is the main power supply source in the PDA, but the volume of the battery is limited in a PDA. A power control system can alert users to the exhaustion of the volume of the battery and allow users to control the consumption of the volume of the battery. For instance, users can store data, change another battery, or recharge the PDA using an external power supply before the exhaustion of the battery so that data is not lost or so that damage does not occur in the PDA due to over-discharging. In view of the above, an effective and perfect power control system is emphasized in modern industry.

In the prior art, many patents concerning power control systems for saving the power have been issued. For example, in U.S. Pat. No. 6,138,232, Shiell et al. taught a microprocessor that operates at a rate dependent upon an interrupt source and returns to On mode by detecting any interrupt of input signals. In U.S. Pat. No. 5,951,689, Evoy et al. described the circuit architecture of a microprocessor. In U.S. Pat. No. 5,581,772, Nanno et al. taught that a microprocessor and a CPU (Central Processing Unit) control a power system of a computer, but the technology is mainly management of switching an external power supply connected to a computer. The foregoing prior arts only discuss the power control system in the microprocessor instead of discussing the power control system of the whole system and the CPU.

To reduce the power consumption of a PDA in the present power control system, the power supply of the electric component can be cut or reduced when the system is in an idling state. The power control system in the PDA is capable of detecting whether input buttons, display devices, and other components are switched on. If the power control system does not detect any activity during a certain period, the power supply of the main system will be shut down temporarily. However in the prior art, the power management in the PDA is usually controlled by the CPU and assisted by the microprocessor, neglecting the feasibility of using the microprocessor to control the power management of the PDA. Therefore besides consuming a lot of system resources, the prior art method is dangerous because the large power consumption of using the CPU to control the power management of the whole system could result in over-discharging. To solve the above problem, not only can the technology of the prior art pertaining to the power control system of the microprocessor be utilized, but also the microprocessor can be used to manage the whole power control system in the PDA. Furthermore a multiplexing microprocessor is a better choice to monitor tasks of little power consumption, like a display of the system electric power or a debounce control program, simultaneously, for reducing the power consumption of the system and ensuring that the tasks of little power consumption still can work under the low power condition.

There are problems related to power management in the foregoing prior arts, and no technology discloses how to manage the power control system of the PDA with the microprocessor entirely for reducing the unnecessary power consumption.

SUMMARY OF INVENTION

It is therefore a primary objective of the claimed invention to provide a method of power control system for a PDA with a microprocessor to solve the above-mentioned problems of the prior art.

According to the claimed invention, a method used in a power control system for a PDA with a microprocessor is supplied. The PDA comprises a central processing unit (CPU) for processing data and a microprocessor which is electrically connected to the power control system and the CPU for controlling the power control system. The method comprises (a) using the microprocessor to switch the PDA from OFF mode to SHUTDOWN mode, wherein when the PDA is in OFF mode, the CPU and the microprocessor are both off, and when the PDA is in SHUTDOWN mode, the CPU is off while the microprocessor is on; (b) after step (a), using the microprocessor to switch the PDA from SHUTDOWN mode to ON mode, wherein when the PDA is in ON mode, the CPU and the microprocessor are both on; and (c) after step (b), using the microprocessor to switch the PDA between ON mode and STANDBY mode, wherein when the PDA is in STANDBY mode, the CPU idles and the microprocessor sleeps, and an operating current in the CPU during IDLE mode is smaller than the operating current during ON mode, and an operating current in the microprocessor during SLEEPING mode is smaller than the operating current during ON mode.

It is an advantage of the claimed invention that instead of using the CPU, the microprocessor can manage a power control system of the PDA for reducing the power consumption and avoiding over-discharging damage to a battery.

It is an advantage of the claimed invention that the microprocessor can control an LED panel of the PDA to display the status of the power control system with less power consumption.

It is an advantage of the claimed invention that the microprocessor can control a debounce control program for eliminating any disturbance produced by pushing down the power button.

It is an advantage of the claimed invention that the microprocessor can switch between SHUTDOWN mode, ON mode, and STANDBY mode to reduce the power consumption.

It is an advantage of the claimed invention that when the volume of the battery is less than a critical voltage, the microprocessor is capable of switching the CPU from ON mode to IDLE mode or preventing the CPU from switching from IDLE mode to ON mode, for avoiding the over-discharging damage to a battery.

These and other objectives and advantages of the present invention will no doubt become obvious to those of ordinary skill in the art after reading the following detailed description of the preferred embodiment that is illustrated in the various figures and drawings.

DETAILED DESCRIPTION

Figure 1:
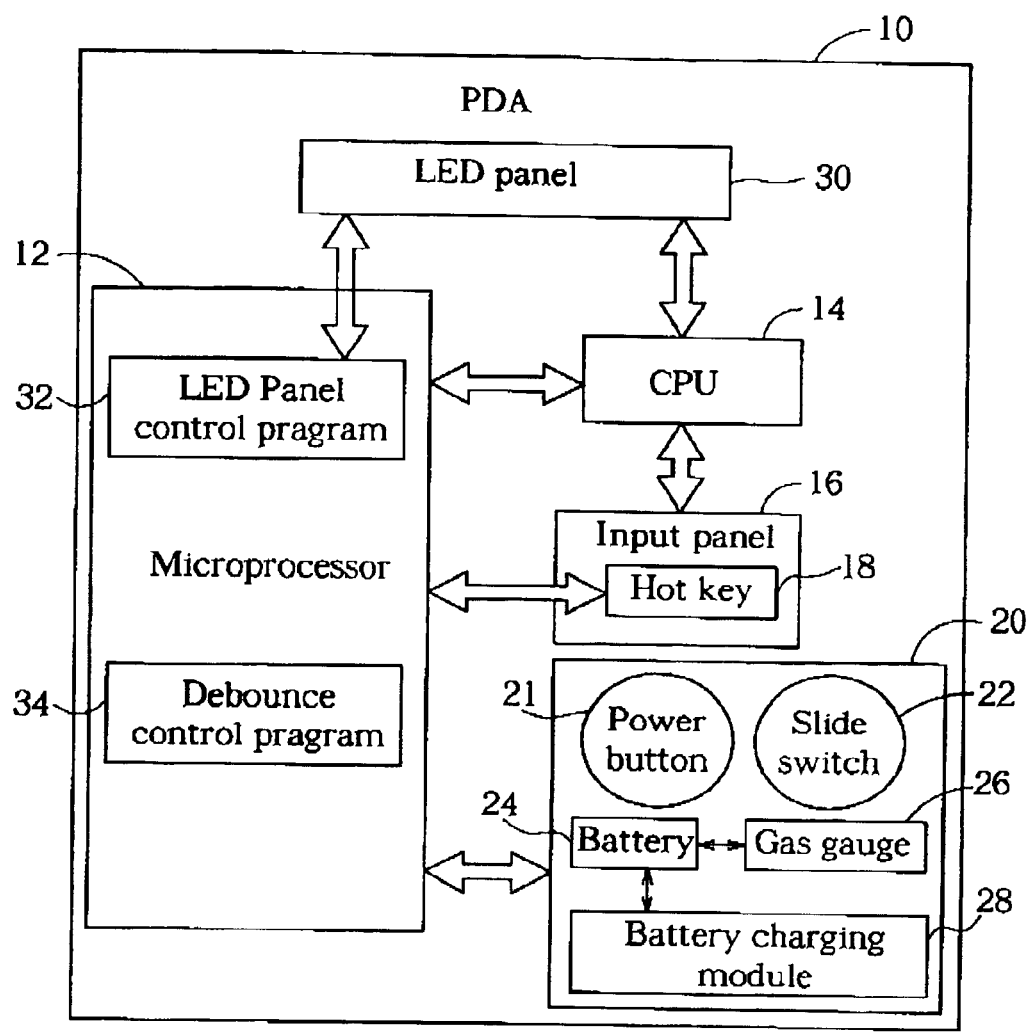
FIG. 1 is a functional block diagram of a PDA.

Please refer to FIG. 1. FIG. 1 is a functional block diagram of a personal digital assistant (PDA) 10 using a microprocessor to manage a power system. The PDA 10 comprises a central processing unit (CPU) 14, a microprocessor 12, a light emitting diode (LED) panel 30, a plurality of input buttons 16, and a power control system 20. The power control system 20 provides operation power to the PDA 10 and the LED panel 30, and the plurality of input buttons 16 are assembled on the case of the PDA 10 for displaying the state of the power control system 20 and allowing users to input signals in the PDA 10. Furthermore the CPU 14 electrically connected to the plurality of input buttons 16 processes the input signals and the microprocessor 12 electrically connected to the power control system 20, CPU 14, and the LED panel 30 controls the power system and displays the state of the power control system 20 on the LED panel 30.

The power control system 20 of the PDA 10 comprises a slide switch 22 for switching the PDA 10 from OFF mode to SHUTDOWN mode, a power button 21 for switching the PDA 10 between SHUTDOWN mode, ON mode, and STANDBY mode, wherein the modes are different operating conditions and switched by the microprocessor 12, a battery 24 for providing power to the PDA 10, a battery charging module 28 for receiving electricity from an external power supply and for detecting whether the providing voltage connected to the external power supply is applied, and a gas gauge 26 electrically connected to the battery 24 for detecting volume of the battery 24.

Figure 2:
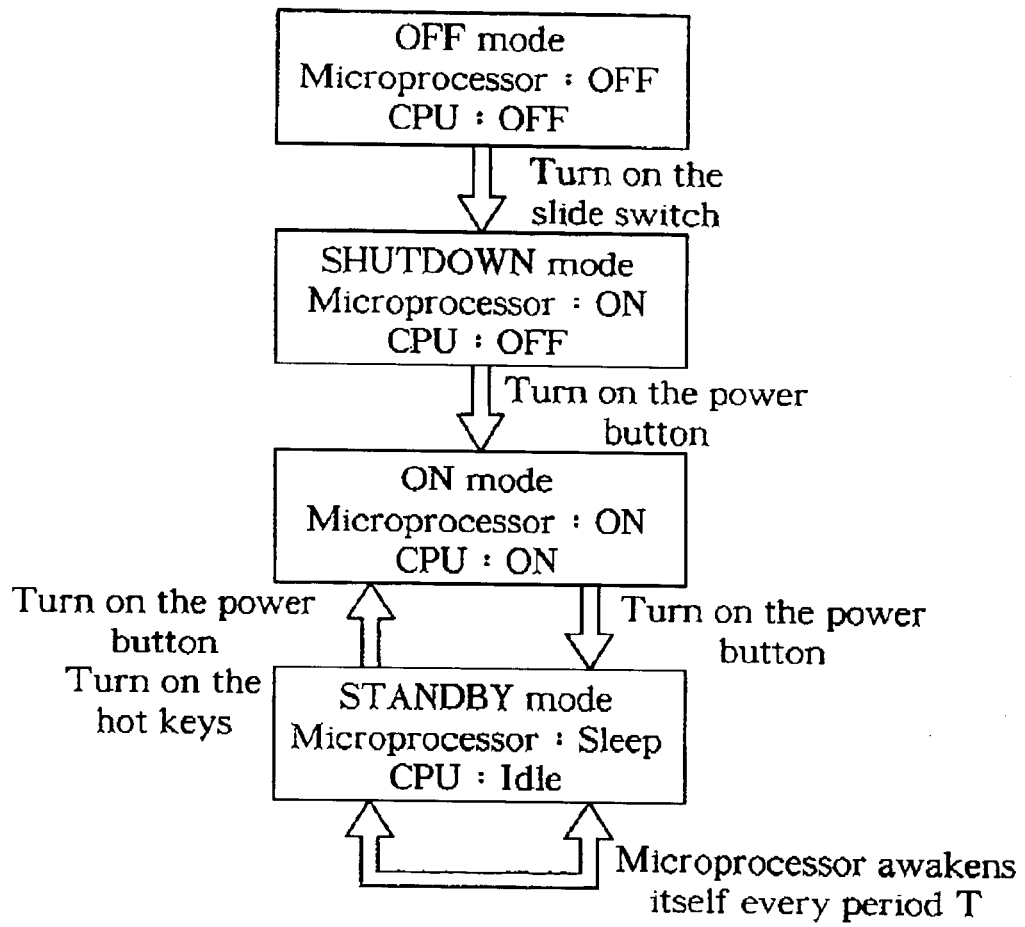
FIG. 2 is a state flowchart of the PDA in different modes according to the present invention.

Please refer to FIG. 2. FIG. 2 is a state flowchart of the PDA in different modes according to the present invention. For simplicity, the identical labeled components of FIG. 1 and of FIG. 2 have the same function. Initially, the PDA 10 is in OFF mode and at the same time the CPU 14 and the microprocessor 12 are both in OFF mode and do not consume any power. When the slide switch 22 is in ON mode, the microprocessor 12 switches the PDA 10 from OFF mode to SHUTDOWN mode, where the CPU and the microprocessor are both off in OFF mode. In SHUTDOWN mode, the CPU is off and the microprocessor is on, wherein the microprocessor 12 can operate with a lower operating current of about several milliamperes during maximum operation in SHUTDOWN mode. When users want to use the functions of the PDA 10, the power button 21 can be turned on and the microprocessor 12 is capable of switching the PDA 10 from SHUTDOWN mode to ON mode in which the CPU 14 and the microprocessor 12 are both on in ON mode, wherein the CPU 14 and the microprocessor 12 can operate in an operating current of about one hundred milliamperes to several hundred milliamperes during maximum operation, which is much higher than the operating current of the microprocessor 12. In FIG. 2, when the power button 21 is turned on again, the microprocessor 12 switches the PDA 10 from ON mode to STANDBY mode, wherein during STANDBY mode the CPU 14 idles and the microprocessor 12 sleeps, and when the CPU 14 idles, the operating current of about several milliamperes is much lower than in ON mode. When the microprocessor 12 is in SLEEPING mode, the microprocessor 12 operates at a clock with a period T and is in ON mode during half of the period T and is in OFF mode during another half of the period T. Therefore, the appropriate period value, which is less than the period value users spend turning on buttons, can allow the microprocessor 12 to detect any operation of users in ON mode during half of the period T for awakening the microprocessor 12 and the PDA 10 again. And when the microprocessor 12 is in SLEEPING mode, the operating current of the microprocessor 12 can drop to several microamperes, which is much less than the operating current of the microprocessor 12 in ON mode, and the operating life of the PDA 10 can be extended in STANDBY mode due to the power savings of the microprocessor 12 and the CPU 14.

Please refer to FIG. 2. When the PDA 10 is in STANDBY mode, the microprocessor 12 is capable of switching the PDA 10 between STANDBY mode and ON mode with a push of the power button 21. The plurality of input buttons 16 comprises a plurality of hot keys 18 and when the PDA 10 is in STANDBY mode, the microprocessor 12 is capable of switching the PDA from STANDBY mode to ON mode when any one of the plurality of hot keys 18 is pushed down.

Figure 3:
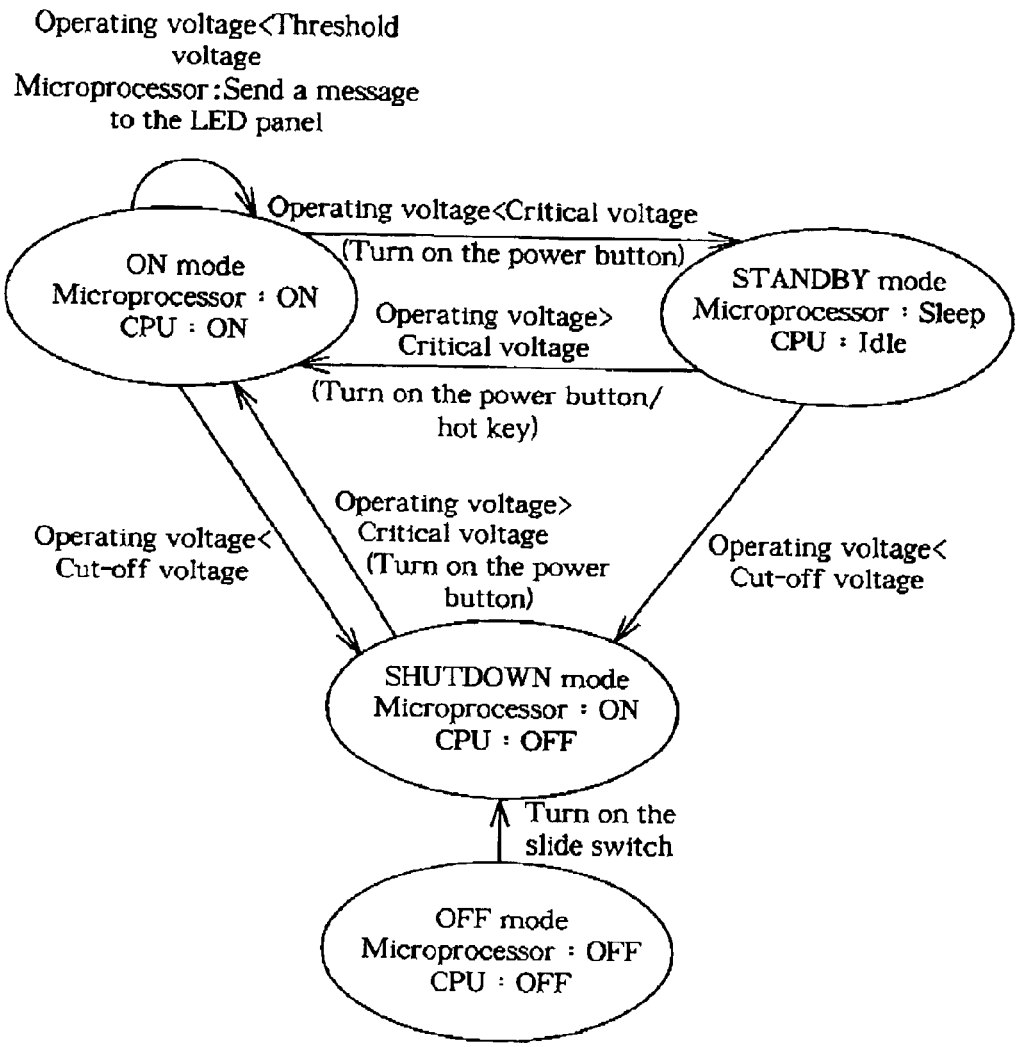
FIG. 3 is a flowchart of the different voltage value of the PDA in different modes according to the present invention.

The microprocessor 12 of the PDA 10 comprises a control program of the LED panel 32 for controlling the LED panel 30 to display the status of the power control system 20 of the PDA 10. Please refer to FIG. 3. FIG. 3 is a flowchart of the different voltage values of the PDA 10 in different modes according to the present invention. When the volume of the battery 24 detected by the gas gauge 26 is lower than a threshold voltage, the microprocessor 12 is capable of transmitting a message to the LED panel 30 so as to produce a flash of light on the LED panel 30 for reminding users to charge the PDA 10 with the battery charging module 28 connected to an external power supply. When the battery charging module 28 detects that the providing voltage connected to an external power supply is not applied, the microprocessor 12 transmits an error message to the LED panel 30 to warn users to pull out the external power supply for protecting the circuit of the PDA 10. When the volume of the battery 24 detected by the gas gauge 26 is lower than a critical voltage, the microprocessor 12 switches the CPU 14 from ON mode to IDLE mode and/or prevents the CPU 14 from switching from IDLE mode to ON mode to avoid the over-discharging damage to the battery 24. When the volume of the battery 24 detected by the gas gauge 26 is lower than a cut-off voltage, the microprocessor 12 switches the PDA 10 from STANDBY mode to SHUTDOWN mode and switches the CPU 14 to OFF mode, so that only the microprocessor 12 monitors the power control system 20 of the PDA 10 to avoid the over-discharging damage to the battery 24.

The microprocessor 12 of the PDA 10 comprises a debounce control program 34 for disregarding a signal produced by the power button 21 to eliminate the disturbance during a certain period after pushing down the power button 21. The present invention provides a method in which the microprocessor 12 controls the power control system 20 of the PDA 10, the LED panel 30, and the debounce control program 34, so that even while in the low power condition, the microprocessor 12 still can monitor the power control system 20 and operate the debounce control program 34 with a small power consumption.

In contrast to the prior art, the present invention provides a method of managing a power control system of a PDA with a microprocessor instead of a CPU. Furthermore the present invention can utilize the microprocessor to switch the power control system between SHUTDOWN mode, ON mode, and STANDBY mode according to the volume of a battery to reduce the power consumption and to avoid the over-discharging damage to the battery.

Those skilled in the art will readily observe that numerous modifications and alterations of the method may be made while retaining the teachings of the invention. Accordingly, the above disclosure should be construed as limited only by the metes and bounds of the appended claims.

What is claimed is:

1. A method used in a power control system for a personal digital assistant (PDA) with a microprocessor, the method comprising:
    (a) using the microprocessor to switch the PDA from OFF mode to SHUTDOWN mode, wherein when the PDA is in OFF mode, a central processing unit (CPU) and the microprocessor are both off, and when the PDA is in SHUTDOWN mode, the CPU is off while the microprocessor is on;
    (b) after step (a), using the microprocessor to switch the PDA from SHUTDOWN mode to ON mode, wherein when the PDA is in ON mode, the CPU and the microprocessor are both on; and
    (c) after step (b), using the microprocessor to switch the PDA between ON mode and STANDBY mode, wherein when the PDA is in STANDBY mode, the CPU idles and the microprocessor sleeps, and an operating current in the CPU during IDLE mode is smaller than the operating current during ON mode, and an operating current in the microprocessor during SLEEPING mode is smaller than the operating current during ON mode.

2. The method of claim 1 wherein step (a) is started by turning on a slide switch and step (b) is started by turning on a power button, and step (c) is started by turning on the power button a second time.

3. The method of claim 2, wherein during step (c) the PDA mode is toggled between STANDBY mode and ON mode by each successive operation of the power button.

4. The method of claim 1 wherein when the PDA is in STANDBY mode, the microprocessor switches the PDA to ON mode when any hot key is pushed down.

5. The method of claim 1 wherein when the microprocessor is in SLEEPING mode, the microprocessor is in ON mode dining half of a clock period and in OFF mode during a complementary half of the clock period.

6. The method of claim 1 wherein the method further comprises when the volume of a battery of the PDA is lower than a threshold voltage, the microprocessor transmits a message to a light emitting diode (LED) panel so as to produce a flash of light on the LED panel.

7. The method of claim 6 wherein after a power button is pushed down, a debounce control program disregards a signal produced by the power button for eliminating any disturbance during a certain period.

8. The method of claim 6 wherein when a providing voltage connected to an external power supply is not applied, the microprocessor transmits an error message to the LED panel to warn users to pull out the external power supply.

9. The method of claim 6 wherein when the volume of the battery detected by a gas gauge is less than a critical voltage, the microprocessor switches the CPU from ON mode to IDLE mode or prevents the CPU from switching from IDLE mode to ON mode.

10. The method of claim 6 wherein when the volume of the battery detected by a gas gauge is less than a cut-off voltage, the microprocessor switches the PDA from STANDBY mode to SHUTDOWN mode.

11. A personal digital assistant (PDA) comprising:
    a power control system comprising:
        a slide switch for switching the PDA from OFF mode to SHUTDOWN mode;
        a power button for switching the PDA between SHUTDOWN mode, ON mode, and STANDBY mode;
        a battery for providing power to the PDA;
        a battery charging module for receiving electricity from an external power supply and for detecting whether a providing voltage connected to the external power supply is applied;
    a gas gauge for detecting volume of the battery;
    a plurality of input buttons for allowing users to input signals to the PDA;
    a central processing unit (CPU) electrically connected to the plurality of input buttons for processing the input signals;
    a light emitting diode (LED) panel for displaying the status of the power control system; and
    a microprocessor which is electrically connected to the power control system, the CPU, and the LED panel for controlling the power control system of the PDA; and for performing the following functions:
    when the slide switch is in ON mode, the microprocessor is capable of switching the PDA from OFF mode to SHUTDOWN mode, where in OFF mode, the CPU and the microprocessor are both off, and where in SHUTDOWN mode, the CPU is off and the microprocessor is on;
    after the power button is turned on, the microprocessor is capable of switching the PDA from SHUTDOWN mode to ON mode where the CPU and the microprocessor are both on in ON mode;
    after the power button is turned on again, the microprocessor is capable of switching the PDA from ON mode to STANDBY mode, wherein during STANDBY mode the CPU idles and the microprocessor sleeps; and
    when the power button is turned on every time afterwards, the microprocessor is capable of switching the PDA between ON mode and STANDBY mode, and the operating current in the CPU during idling state is much lower than the operating current in the CPU during ON mode, and the operating current in the microprocessor during the sleeping state is much lower than the operating current in the microprocessor during ON mode.

12. The PDA of claim 11 wherein when the PDA is in STANDBY mode, the microprocessor is capable of switching the PDA from STANDBY mode to ON mode when any one of the input buttons is pushed down.

13. The PDA of claim 11 wherein the microprocessor further comprises:
    a control program of the LED panel for controlling the LED panel to display the status of the power control system of the PDA; and
    a debounce control program for eliminating any disturbance produced by pushing down the power button.

14. The PDA of claim 13 wherein after the power button is pushed down, the debounce control program is capable of disregarding a signal produced by the power button for eliminating the disturbance during a certain period.

15. The PDA of claim 11 wherein when the microprocessor is in SLEEPING mode, the microprocessor is in ON mode during half of a clock period and in OFF mode during a complementary half of the clock period.

16. The PDA of claim 11 wherein when the volume of the battery detected by the gas gauge is lower than a threshold voltage, the microprocessor is capable of transmitting a message to the LED penal so as to produce a flash of light on the LED panel for reminding users to charge the PDA.

17. The PDA of claim 11 wherein when the volume of the battery detected by the gas gauge is lower than a critical voltage, the microprocessor is capable of switching the CPU from ON mode to IDLE mode or preventing the CPU from switching from IDLE mode to ON mode when any of the input buttons or the power button are operated.

18. The PDA of claim 11 wherein when the volume of the battery detected by the gas gauge is lower than a cut-off voltage, the microprocessor is capable of switching the PDA from STANDBY mode to SHUTDOWN mode.

19. The PDA of claim 11 wherein when the battery charging module detects that the providing voltage connected to an external power supply is not applied, the microprocessor is capable of transmitting an error message to the LED panel to warn users to pull out the external power supply.

* * * * *